Figure 1:
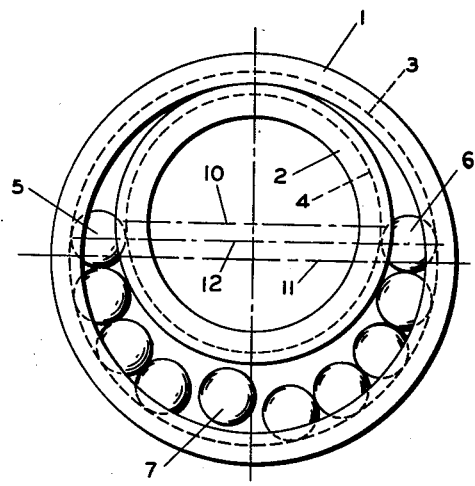

April 7, 1953　　　　　E. H. OLMSTEAD　　　　　2,633,627
METHOD OF ASSEMBLING BEARING ELEMENTS
Original Filed June 28, 1947　　　　　　　　　3 Sheets-Sheet 1

INVENTOR.
EDWIN H. OLMSTEAD
BY
ATTORNEY

April 7, 1953        E. H. OLMSTEAD        2,633,627
METHOD OF ASSEMBLING BEARING ELEMENTS
Original Filed June 28, 1947        3 Sheets-Sheet 2
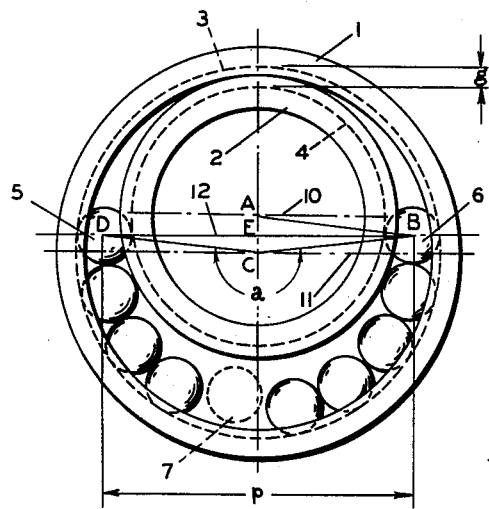
Fig_5_
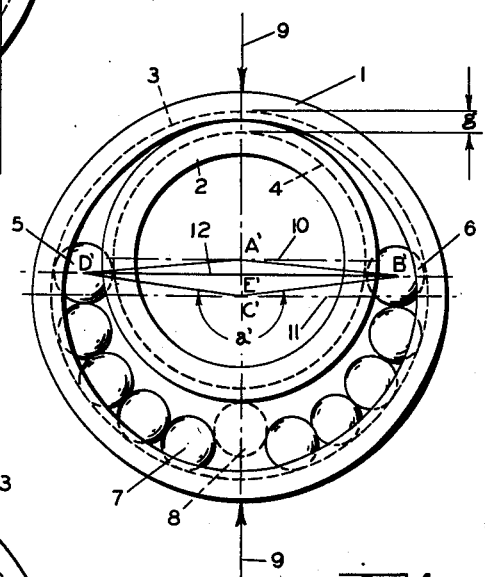
Fig_6_
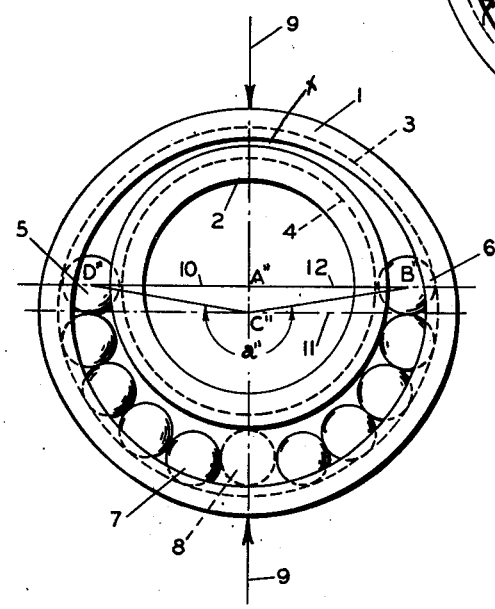
Fig_7_
INVENTOR.
EDWIN H. OLMSTEAD
BY
Frank H. Harmon
ATTORNEY April 7, 1953    E. H. OLMSTEAD    2,633,627
METHOD OF ASSEMBLING BEARING ELEMENTS
Original Filed June 28, 1947    3 Sheets-Sheet 3
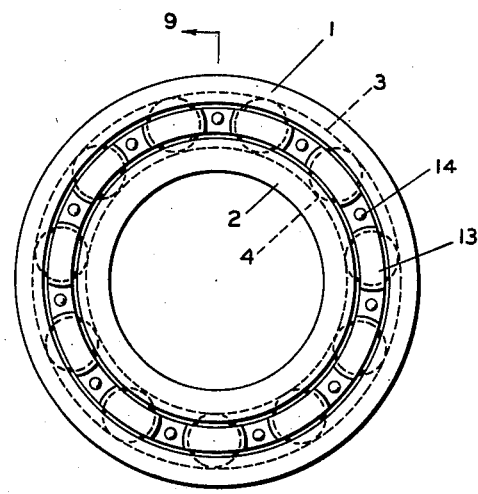
Fig._8_
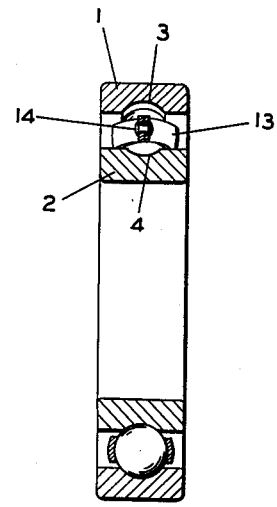
Fig._9_
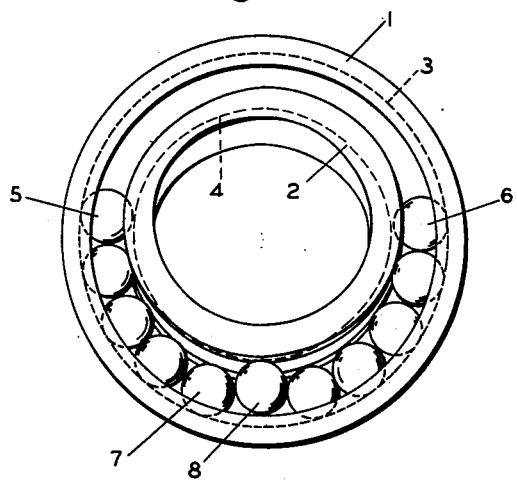
Fig._10_
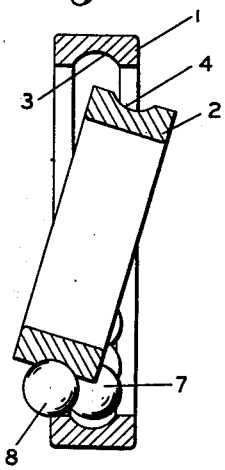
Fig._11_
INVENTOR.
EDWIN H. OLMSTEAD
BY
Frank H. Harmon
ATTORNEY Patented Apr. 7, 1953

2,633,627

UNITED STATES PATENT OFFICE 2,633,627

METHOD OF ASSEMBLING BEARING ELEMENTS

Edwin H. Olmstead, Carlisle, Pa., assignor to Jack & Heintz Precision Industries, Inc., Cleveland, Ohio, a corporation of Delaware Continuation of application Serial No. 757,825, June 28, 1947. This application January 31, 1951, Serial No. 208,774

4 Claims. (Cl. 29—148.4)

This invention relates in general to rolling bearing assemblies, and more particularly to improvements in methods of assembling the same, and is a continuation of my application for United States Letters Patent, Edwin H. Olmstead filed June 28, 1947, Serial No. 757,825, for Anti-Friction Bearing Assembly, now abandoned.

The conventional method of assembling bearings, employing balls and uniform uninterrupted bearing races, is well illustrated in the two U. S. patents to Robert Conrad 822,723, June 5, 1906 and 838,303, December 11, 1906. The major limitation and disadvantage of this conventional method is the small number of balls that may be thus assembled in the races, thus keeping the total capacity low. There are approximately only one-half the maximum number of balls in the space provided for in the races, because of the method of assembly.

One of the primary objects of the present invention is to provide an improved method of assembly whereby an increased number of rolling elements may be assembled in the races, even if the races have uniform uninterrupted walls, and without damage to the races or rolling elements.

With the foregoing and other objects in view, the invention resides in the combination of parts, the details of construction and the method employed as set forth in the following specifications and appended claims, certain embodiments thereof being illustrated in the accompanying drawings, which illustrate various steps of assembling the balls in the bearing races and each of which eleven figures will be dealt with in particularity in the following specification, inasmuch as the usual brief description of the figures could not be brief and would make for repetitious disclosure.

Referring more particularly to the drawings, the outer race 1 has its raceway shown in dotted lines at 3, and the inner race 2 its raceway shown in dotted lines at 4. Throughout the figures, the center line of the inner race is shown at 10 and the center line of the outer race at 11. Line 12 represents the common center line of the two outermost balls 5 and 6. Figures 8 and 9 show a complete bearing assembly with the balls and their cage 13 with separating spot welds 14.

Figure 4:
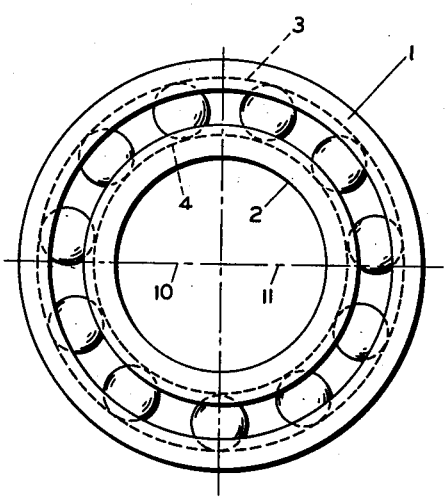

In the conventional method of assembly, the inner race 2 is displaced upwardly until it touches the outer race 1, as shown in Figure 1, leaving the combined depth of the grooves 3 and 4 to equal $g$, indicated in Figures 5 and 6. This leaves a crescent shaped opening between the inner and outer races, into which opening the balls are then inserted. Then the inner race 2 is lowered until it is centered with respect to the outer race 1, after which the balls are equally spaced, as shown in Figure 4 and the ball cage is installed, as shown in Figures 8 and 9.

In this conventional method of assembly, the center line 10 of the inner race 2 in Figure 1 is above the center line 12 of the outermost highest balls 5 and 6, which in turn is above the center line 11 of the outer race 1. The maximum number of balls that may be inserted in the races by this method is solved geometrically by using the triangle ABC of Figure 5. If the ball diameter is taken as 1, the total combined groove depth of both races as $g$, the pitch diameter over the ball diameter as $p$, then AC is equal to $1-g$; BC is equal to $p/2$; the sine CBD is equal to $(1-g)/(p/2)$; the sine of the angle subtended by a half ball is $1/p$; and then the number of balls N is equal to:

$$N = 1 + \left( \frac{+2 \sin^{-1}\left(\frac{2-2g}{p}\right)}{2 \sin^{-1}(1/p)} \right)$$

Since the groove depth remains substantially constant for all types at about $g=.35$, assume an average light series bearing where $p$ is equal to 5.44 and the formula for this average bearing gives 10.8 balls and the angle subtended by balls, angle BCD is equal to 270.7°.

In my effort to increase the number of balls in the bearing I propose to squeeze the outer race out of round by applying a diametrically converging force as shown in Figure 6 by the arrows 9—9. This expands the outer race sideways and permits the outermost balls 5 and 6 (or B' and D') to move further upwardly in the crescent shaped opening between the races and creates more room for the insertion of an additional ball 8, next to ball 7.

The extent to which this process can be carried is limited by the properties of the steel used. Beyond a certain squeeze the race takes on a permanent distortion or may even break. The allowable amount of squeeze has been determined by increasing it until actual breakage and distortion occurs regularly. The largest squeeze that will not cause distortion by these tests has been determined as equal to .00457 $r^2/t$ where $r$ is the average radius of the outer ring and $t$ the radial thickness. This squeeze corresponds to a stress in the steel of 148,000 pounds per square inch for current ball bearing steel.

This squeeze increases the number of balls that can be assembled by the amount that angle $a$ in Figure 5 is increased to give angle $a'$ in Figure 6. It is obtained by solving the triangle $A'B'C'$. If the amount of squeeze is $s(s=$ actual snap/ball diameter), then the number of balls becomes equal to:

$$N-1+\left(\frac{\pi+2\sin^{-1}\left(\frac{1-g+2s}{1/2p}\right)}{2\sin^{-1}(1/p)}\right)$$

For the average light series bearing checked above, this number of balls becomes 11.11, and the angle $a'$ is equal to 214.2°, an increase of 3.2% in the allowable number of balls.

Before final assembly of the bearing the inner race must be forced down to a concentric position. Since the opening between the top balls, B' and D' in Figure 6 is less than the diameter of the inner race along the line A', this requires additional distortion of the outer race. The additional distortion is equal to length BD minus the ball diameter minus the length of the diameter of the inner race along line A.

Figure 2:
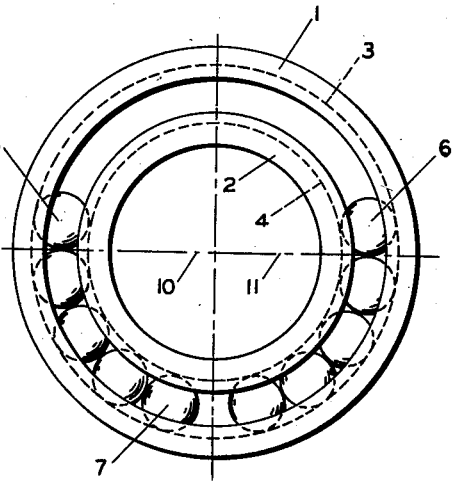

If the conventional assembly, shown in Figures 1 and 2, were to avoid any race distortion at all, then the balls could not extend at all above the line DEB in Figure 5 and the angle $a$ subtended by the balls could only be 180°. The formula for the maximum number of balls without any race distortion then becomes $1+\pi/2\times\sin(1/p)$ and the number of balls for the average light series bearings posed above becomes 9.50. This proves that even the conventional method of assembly of the bearing does use a small but definite amount of distortion, unless the number of balls were abnormally reduced.

In the case where distortion is definitely used, then after the balls are entered the inner race must be moved down and again is wider than the space between the two top balls B' and D' and the race must receive additional distortion in moving the inner race downward. If it is assumed that the maximum pressure already applied is all that the race can stand without permanent distortion then this additional distortion from the assembly operation would actually give trouble. In practice, the outer race is not distorted to its full limit and that is why the stress given above is not up to the maximum allowable for this type of steel. Actually the maximum stress is probably attained during the last moment of assembly when the inner race is forced down between the two top balls.

This moment of maximum distortion is illustrated in Figure 7 and definitely changes the formula that is to be used for the maximum allowable number of balls. This is now determined by solving the triangle $A''B''C''$ and is equal to:

$$N=1+\left(\frac{\pi+2\cos^{-1}\left(\frac{p}{p+.94s}\right)}{2\sin^{-1}(1/p)}\right)$$

For the average light series bearing supposed above, this would be 10.38 balls and the angle $a''$ equal to 198.2°.

Accordingly, I have provided a means for avoiding this loss in ball capacity from 11.11 down to 10.38 by avoiding this last assembly operation of forcing the balls down to the concentric position and substituting for it a preceding operation. This preceding operation in the assembly procedure makes it unnecessary to raise the balls to the point where they are above the smaller distance between the two top balls. In fact it avoids ever reaching this position. In other words the present method of assembly never exceeds the 10.38 ball total but the invention which I have proposed permits achieving the 11.11 number of balls which would represent 7% increase in ball capacity. This new operation is as follows: the bearing is first assembled completely with one or two less than the maximum or final number of balls, using the conventional method as shown in Figures 1 and 2. Then the balls are spread at the bottom to leave room for just the one or two additional balls as shown approximately in Figure 2. Then the inner race is raised again as it was in Figure 1 before being shifted down to Figure 2 but in this case the inner race is not raised all the way up, it is only raised just enough to enter the additional ball, number 8, and leaving an appreciable opening in the upper part of the bearing. This operation is performed in the presence of the maximum allowable distortion as used previously.

It is then possible to enter the number originally calculated for the assembly with a maximum allowable distortion and per the formulas given above would be 11.11 balls for the average bearing. Previously only the 10.38 balls were obtainable. Actually, there is room for slightly more.

Figure 3:
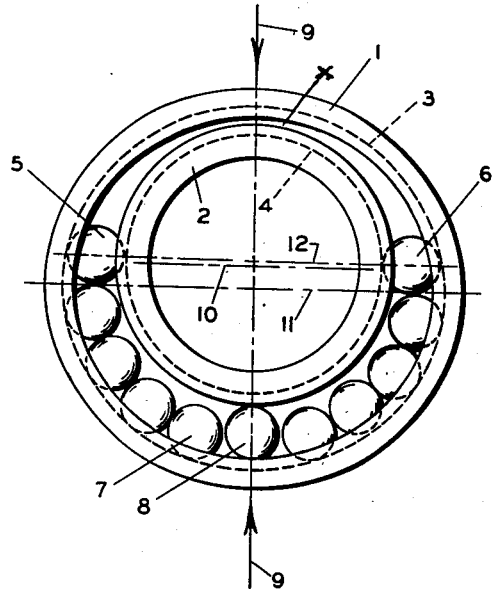

In Figure 3, the opening between the two races at the bottom to admit the ball number 8 requires a total space between the two actual ball paths of the ball diameter plus the depth, $g$, of the two races.

In some bearings where the number of balls is not too high it is possible to tilt the inner race as illustrated in Figures 10 and 11. The amount of tilt is limited by what happens between balls numbers 5 and 6 and the ones below it. The next balls below it would interfere if there are too many balls or if the angle of tilt is excessive.

Where the tilt is permissible and can be carried far enough the additional ball, number 8 of Figure 10, can be recessed in the groove of the inner race and the opening needed to admit this ball is only equal to the ball diameter plus the groove depth of the outer race. This means that the inner race can be raised even less than shown in Figure 3 and the distance $x$ can be left even greater.

I claim:

1. The method of inserting and assembling bearing rolling elements in the uninterrupted circular bearing grooves of an inner and outer bearing race, which consists in disposing said races in coplanar alignment and adjusting the same to maximum relative eccentricity, inserting in one of said grooves, so as to be positioned between said grooves, the maximum number of rolling elements allowable without distortion of either race, the subsequent relative shifting of said races to concentricity, the subsequent spreading of said rolling elements to provide space for additional rolling elements, the temporary distortion of at least one of said races to a strain not greater than the maximum allowable without permanent distortion, in a direction to provide a space between the races for further outward movement of the two outermost rolling elements, the shifting of said races towards eccentricity short of the maximum eccentricity without the center line of the inner race being disposed beyond the common center line of the two outermost rolling elements, and just enough to provide an opening for the insertion of an additional rolling element, while leaving an appreciable opening between the grooves of the inner and outer bearing races in the other part of the bearing assembly and the inserting of an additional rolling element in said space between said groove races while said race is under distortion and the final adjustment of said races to concentricity with said rolling elements disposed in and between said bearing grooves.

2. The method of inserting and assembling bearing rolling elements in the uninterrupted circular bearing grooves of an inner and outer bearing race, which consists in disposing said races in coplanar alignment and adjusting the same to maximum relative eccentricity, inserting in one of said grooves, so as to be positioned between said grooves, the maximum number of rolling elements allowable without distortion of either race, the subsequent relative shifting of said races to concentricity, the subsequent spreading of said rolling elements to provide space for additional rolling elements, the temporary distortion of said outer race to a strain not greater than the maximum allowable without permanent distortion, in a direction to provide a space between the races for further outward movement of the outermost rolling elements, the shifting of said races towards eccentricity short of the maximum eccentricity without the center line of the inner race being disposed beyond the common center line of the two outermost rolling elements, and just enough to provide an opening for the insertion of an additional rolling element, while leaving an appreciable opening between the grooves of the inner and outer bearing races in the other part of the bearing assembly and the inserting of an additional rolling element in said space and between said groove races while said outer race is under distortion, and the final adjustment of said races to concentricity with said rolling elements disposed in and between said bearing grooves.

3. The method of inserting and assembling bearing rolling elements in the uninterrupted circular bearing grooves of an inner and outer bearing race, which consists in disposing said races in coplanar alignment and adjusting the same to maximum relative eccentricity, inserting in one of said grooves, so as to be positioned between said grooves, the maximum number of rolling elements allowable without distortion of either race, the subsequent relative shifting of said races to concentricity, the subsequent spreading of said rolling elements to provide space for additional rolling elements, the application of a compressive force on the rim of said outer race in a radial direction generally perpendicular with respect to the series of assembled rolling elements to provide a temporary distortion of one said outer race to a strain not greater than the maximum allowable without permanent distortion, in a direction to provide a space between the races for further outward movement of the two outermost rolling elements, the shifting of said races towards eccentricity short of the maximum eccentricity without the center line of the inner race being disposed beyond the common center line of the two outermost rolling elements, and just enough to provide an opening for the insertion of an additional rolling element, while leaving an appreciable opening between the grooves of the inner and outer bearing races in the other part of the bearing assembly and the inserting of an additional rolling element in said space and between said groove races while said outer race is under distortion and the final adjustment of said races to concentricity with said rolling elements disposed in and between said bearing grooves.

4. The method of inserting and assembling bearing rolling elements in the uninterrupted circular bearing grooves of an inner and outer bearing race, which consists in disposing said races in coplanar alignment and adjusting the same to maximum relative eccentricity, inserting in one of said grooves, so as to be positioned between said grooves, the maximum number of rolling elements allowable without distortion of either race, the subsequent relative shifting of said races to concentricity, the subsequent spreading of said rolling elements to provide space for additional rolling elements, the relative tilting of said races out of coplanar alignment and the application of a compressive force on the rim of said outer race in a radial direction generally perpendicular with respect to the series of assembled rolling elements to provide a temporary distortion of said outer race to a strain not greater than the maximum allowable without permanent distortion, in a direction to provide a space between the races for further outward movement of the two outermost rolling elements, the subsequent shifting of said races towards eccentricity short of the maximum eccentricity without the center line of the inner race being disposed beyond the common center line of the two outermost rolling elements, and just enough to provide an opening for the insertion of an additional rolling element, while leaving an appreciable opening between the grooves of the inner and outer bearing races in the other part of the bearing assembly and the inserting of an additional rolling element in said space and between said groove races while said outer race is under distortion, and the final adjustment of said races to concentricity with said rolling elements disposed in and between said bearing grooves.

EDWIN H. OLMSTEAD.

REFERENCES CITED

The following references are of record in the file of this patent:

UNITED STATES PATENTS

| Number | Name | Date |
|---|---|---|
| 822,723 | Conrad | June 5, 1906 |
| 967,519 | Hess | Aug. 16, 1910 |

FOREIGN PATENTS

| Number | Country | Date |
|---|---|---|
| 11,353 | Great Britain | May 25, 1908 |
| 615,022 | France | Oct. 1, 1926 |
| 125,542 | Switzerland | Apr. 16, 1928 |